H. H. BALES.
PACKING SCREW.
APPLICATION FILED JUNE 30, 1908.

919,808.

Patented Apr. 27, 1909.
2 SHEETS—SHEET 1.

Witnesses
E. E. Johansen
E. L. Chandlee

Inventor
Haden H. Bales.

By Woodward & Chandlee
Attorney

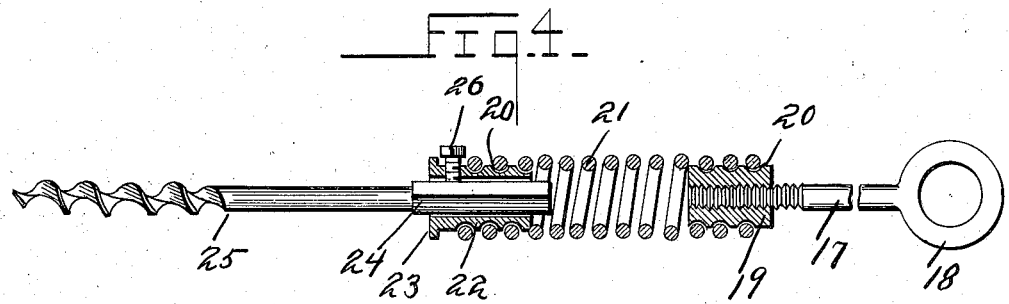
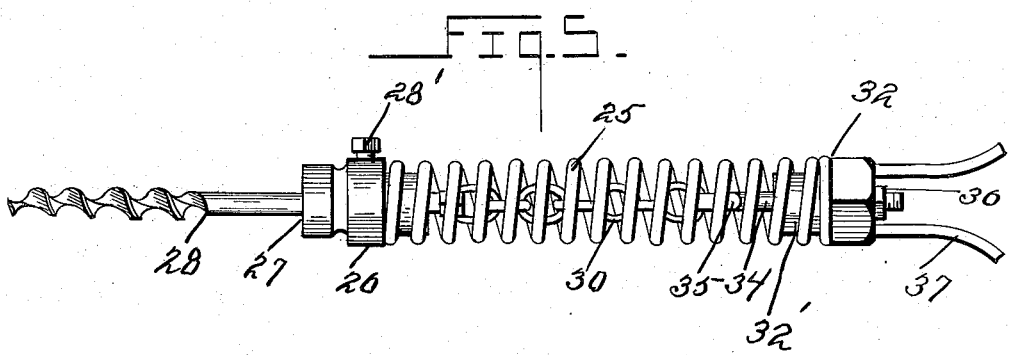
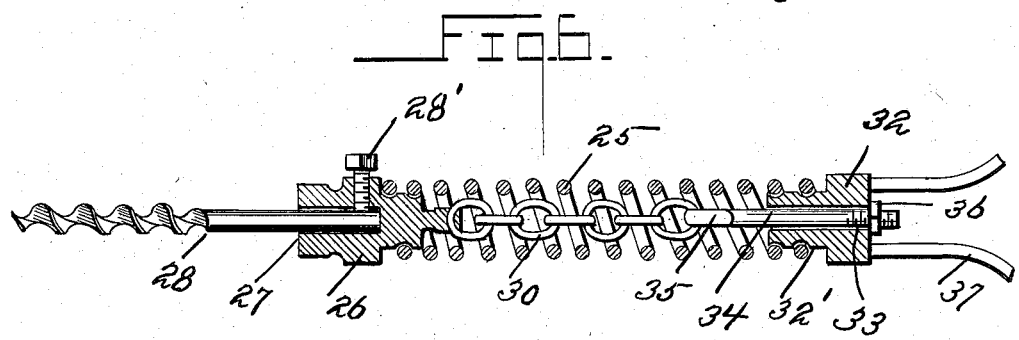

UNITED STATES PATENT OFFICE.

HADEN HERBERT BALES, OF ASHCROFT, BRITISH COLUMBIA, CANADA.

PACKING-SCREW.

No. 919,808.

Specification of Letters Patent.

Patented April 27, 1909.

Application filed June 30, 1908. Serial No. 441,147.

*To all whom it may concern:*

Be it known that I, HADEN HERBERT BALES, a subject of the King of England, residing at Ashcroft, in the county of Yale, Province of British Columbia, Canada, have invented certain new and useful Improvements in Packing-Screws, of which the following is a specification.

This invention relates to tools and more particularly to packing tools, and has for its object to provide a tool with which packing may be removed from or inserted in the stuffing boxes of pumps, engines and similar structures with facility and which will also be simple and cheap.

Other objects and advantages will be apparent from the following description and it will be understood that changes in the specific structure shown and described may be made within the scope of the claims without departing from the spirit of the invention.

Figure 1:
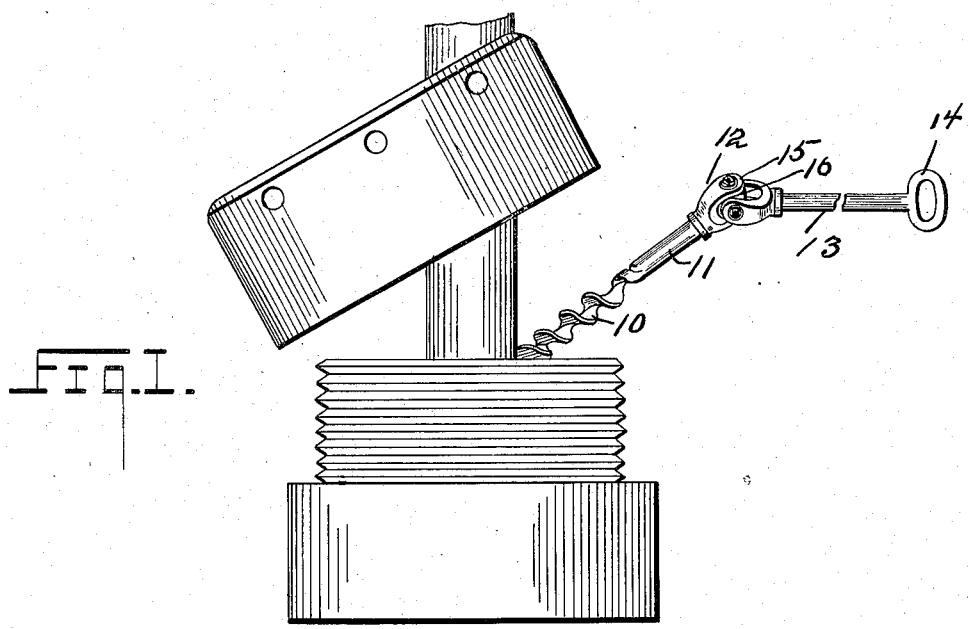
Figure 2:
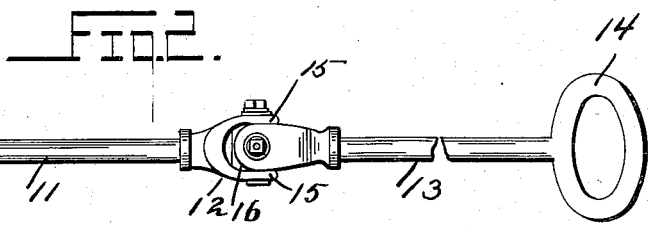

In the drawings forming a portion of this specification and in which like numerals of reference indicate similar parts in the several views, Figure 1 is an elevational view showing the manner of using the present packing tool. Fig. 2 is an elevational view of one form of the tool, Fig. 3 is a similar view showing a second form of tool, Fig. 4 is a section through the tool shown in Fig. 3, Fig. 5 is an elevational view of a third form of tool, Fig. 6 is a longitudinal section through the form of tool shown in Fig. 5.

Referring now more particularly to the drawings, there is shown in Fig. 2 a packing tool comprising a packing engaging screw 10, having the form of a cork screw, and carried by a stem section 11, which is connected by means of a universal joint 12, with a stem section 13 carrying a handle 14. The universal joint 12 comprises two oppositely disposed yokes 15, receiving a block 16 between their arms, and to which block the arms are pivoted. It will thus be seen that the section 13 of the stem may be turned laterally with respect to the section 11, and that by this disposition the section 11 may be rotated through rotation of the handle 14. The handle may thus be moved out of position to engage the piston rod of a pump, or other portions of the structure which might interfere with its operation.

Figure 3:
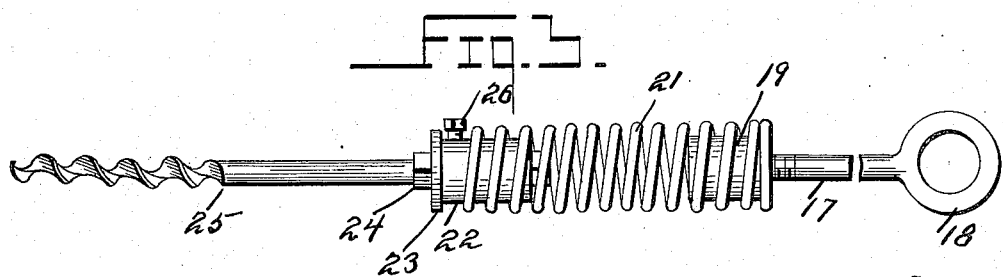

In Fig. 3 of the drawings, there is shown a form of packing tool including a stem 17 having a handle 18 at one end, and having its opposite end threaded and engaged in a frusto-conical block 19, this block being threaded on its outer surface. A stiff helical spring 21 has its helices engaged with the thread 20 of the block 19, and has engaged in its opposite end, a similar exteriorly threaded block 22, having a longitudinally extending angular socket 23 opening through its outer end, for the reception of the angular shank 24 of a bit 25, which may either be a screw bit as shown in the drawings or a stuffing bit for replacing packing. The bit is held with its shank in the socket by means of a set screw 26 engaged in the block 22. The bit may thus be removed for replacement when broken or when changes are desired.

In Fig. 5, there is shown a packing tool consisting of a helical spring 25, having a block 26 engaged in one end, provided with a socket 27 for the reception of a bit 28, this block being equipped with a set screw 28' to hold the bit in the socket. A chain 30 is attached at one end to the block 26, and passes through the spring 25. In the opposite end of the spring from the block 26, there is engaged the reduced portion 32', of a block 32 having a longitudinal passage 33 formed therethrough and receiving the stem 34 of a hook 35, this hook having the chain 30 engaged therewith. The stem 34 of the hook extends outwardly beyond the block 32, and is threaded for the reception of a nut 36, which may be operated to draw the stem of the hook through the passage 33, thus varying the distance between the two blocks 26 and 32, and adjusting the tension of the spring 25. A handle yoke 37 has its ends secured in the block 32, at opposite sides of the opening of the passage 33, and this handle yoke may be grasped for operation of the packing tool. It will be observed that the springs 21 and 25 permit of universal movement of the grip ends of the tool with respect to the packing engaging ends, the two ends of the tool being thus universally connected.

In some cases, when old or hard packing has to be removed from a stuffing box, the operator may find it necessary to pull upon the handle 37 with block and tackle, and in this case, the chain 30 takes the extra strain and prevents undue distortion of the spring.

What is claimed is:

1. A packing tool having a spring portion between its ends arranged for movement of the end portions of the tool out of alinement with each other, said spring portion being also arranged to hold the end portions normally in alinement with each other.

2. A packing engaging tool including a handle consisting in part of a helical spring.

3. A packing tool comprising a helical spring, a packing engaging member connected with one end of the spring and a handle connected with the other end of the spring.

4. A packing tool comprising a spring, blocks engaged in the ends of the spring, a handle connected with one of said blocks and a packing engaging member connected with the other of said blocks.

5. A packing tool comprising a helical spring, blocks engaged in the ends of the spring, a handle connected with one of said blocks, and a packing engaging member connected with the other block.

6. A packing tool comprising a helical spring, blocks engaged in the ends of said spring, flexible connections between the blocks, a handle carried by one of said blocks, and a packing member carried by the other block.

7. A packing tool comprising a helical spring, a block engaged within the helical spring, and a packing member carried by the block.

8. A packing tool comprising a helical spring, a block engaged within one end of the helical spring, a block engaged within the other end of the spring, said second block having a passage formed therethrough, a threaded stem slidably engaged in the passage, a set nut engaged with the stem outwardly of the passage, a chain connected with the stem and with the first named block, and a packing member carried by one of the blocks.

9. A packing tool comprising a helical spring, a handle connected with one end of the spring, a packing member connected with the opposite end of the spring, and means for varying the tension of the spring.

10. In a packing tool, the combination with a packing element including a stock consisting in part of a helical spring, of means for varying the tension of the spring.

11. A packing tool comprising a spring, a packing member carried by one end of the spring, a handle carried by the opposite end of the spring, and means for varying the tension of the spring.

12. A packing tool comprising a spring, a packing member removably connected with one end of the spring, a handle member carried by the opposite end of the spring, and means for varying the tension of the spring, said means being slidably connected with the end of the spring to which the packing member is connected, and slidably connected with the end of the spring to which the handle member is connected.

13. A tool comprising a handle including end portions, a helical spring connected with the end portions and extending therebetween, said spring being arranged for movement of the end portions laterally with respect to each other and toward and away from each other, and means for limiting the movement of the end portions away from each other to hold said end portions with the spring under tension, said limiting means being arranged for lateral movement of the end portions with respect to each other.

14. A packing tool including a handle consisting of two end portions, a helical spring engaged at its ends with the end portions, and a chain connected with an end to each of the end portions of the handle and lying within the helical spring, and means for moving the chain with respect to one of the end portions to vary the tension of the spring.

In testimony whereof I affix my signature, in presence of two witnesses.

HADEN HERBERT BALES.

Witnesses:
GEORGE NELSON BAILEY,
FRANK LIONEL HOWATT.